United States Patent

[11] 3,607,167

| [72] | Inventor | John M. Robertson<br>Louisville, Ky. |
|---|---|---|
| [21] | Appl. No. | 789,036 |
| [22] | Filed | Dec. 31, 1968 |
| [45] | Patented | Sept. 21, 1971 |
| [73] | Assignee | American Standard Inc.<br>New York, N.Y. |

[54] SURFACE TREATMENT OF POROUS BODIES
10 Claims, 2 Drawing Figs.

[52] U.S. Cl................................................ 65/18,
65/30, 65/33, 65/111, 264/56
[51] Int. Cl........................................................C03b 23/20,
C03c 19/00
[50] Field of Search............................................ 65/30, 111,
33, 18; 264/56, 67

[56] References Cited
UNITED STATES PATENTS

| 2,865,139 | 12/1955 | Anderson...................... | 65/111 |
| 2,888,316 | 5/1959 | Anderson...................... | 65/111 X |
| 3,016,598 | 11/1962 | Anderson et al.............. | 264/67 X |
| 3,116,137 | 12/1963 | Vasilos et al.................. | 65/33 X |
| 3,098,699 | 7/1963 | Roy................................ | 65/33 X |
| 3,244,777 | 4/1966 | Halpern........................ | 264/319 X |
| 3,459,503 | 8/1969 | Roy et al....................... | 65/33 X |

*Primary Examiner*—Frank W. Miga
*Attorneys*—Sheldon H. Parker, Tennes I. Erstad and Robert G. Crooks

ABSTRACT: A method of densifying the surface of porous bodies which comprises impacting the surface of the porous bodies with a plurality of spheres sufficient to cause compressive forces in the surface during subsequent firing and vitrification of the porous body.

PATENTED SEP 21 1971 3,607,167

INVENTOR.
John W. Robertson
BY Sheldon F. Parke
ATTORNEY

SURFACE TREATMENT OF POROUS BODIES

This invention relates to surface treatment of porous bodies. More particularly this invention relates to a method of treating the surface of unfired chinaware bodies in order to minimize and even eliminate surface defects that are normally accentuated during firing of the china.

Current practice in the manufacture of chinaware includes major reprocessing operation for the repairing of defects in the chinaware such as "clay cracks" and "pinholes" that appear after firing of the china parts. These defects, although at times invisible to the naked eye in the unfired state, are known to commonly exist in the unfired parts as a result of the conditions of the forming process and strains developed during drying. Thus during firing the defects open up and are accentuated and become readily apparent. Consequently, the tedious task of hand finishing the dry unfired parts of ware with sponges or abrasive pads must subsequently be employed to minimize defectiveness in the fired parts. After the parts have been fired, any defects require grinding, respraying with glaze, and refiring to eliminate the defect. Such repair operations amount to at least 30 percent of all chinaware formed and cost millions of dollars each year.

There has now been found in accordance with this invention that the above costly refinishing operation can be eliminated by densifying, that is increasing the density, and orienting the clay particles at the dry unfired china body. Thus when the china part is fired, compression of the outer surface takes place which in turn acts to close any clay cracks present and to close any pinholes that are normally trying to open in the opposite direction during firing.

This densifying, in accordance with the present invention, is accomplished by impacting the surface of the unfired china body with a very large number of small solid spheres propelled at low velocity. Under proper control, the impact of each sphere causes a slight depression in the surface of the unfired porous china body with considerable densification at the center. Hence, during the firing of the china body, the outer layer of the body that has been impacted with the spheres will densify sooner than the interior of the body. As the entire body finally matures, the outer surface is necessarily forced into compression. The compressive forces built up in the surface of the body are not sufficient to cause any damage to surface integrity of the body. This compression acts to close clay cracks and pinholes that are normally trying to open in the opposite direction during the firing process of the china body.

The objects, features, and advantages of the present invention will be fully understood as the description of the invention proceeds, particularly when taken together with the accompanying drawing wherein.

Figure 1:
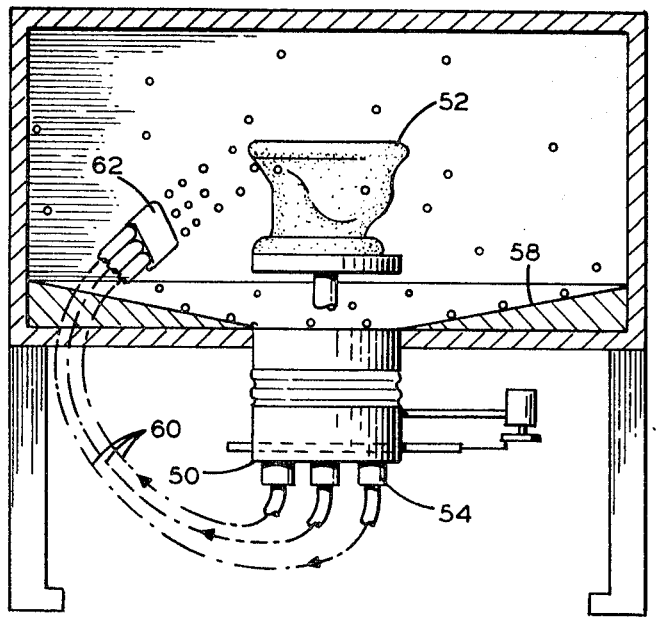
FIG. 1 is a schematic of a preferred apparatus suitable for carrying out the process of the present invention.
Figure 2:
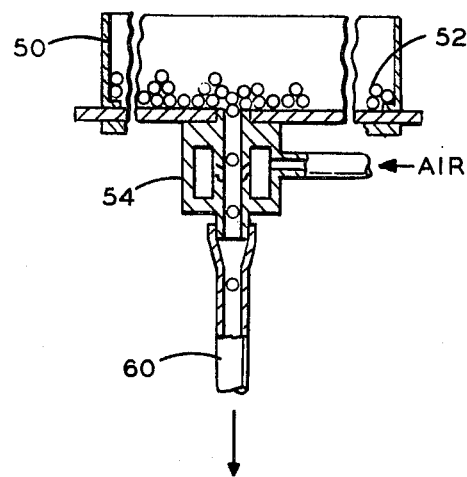
FIG. 2 is a fragmentary elevational view in section taken along 2—2 of FIG. 1.

As shown in FIG. 1 and FIG. 2, a collector hopper 50 is adapted to feed a plurality of spheres 52 at a uniform rate into a gun supply 54 for a propulsion against dry unfired ware 56. The spheres 52 are propelled through hoses 60 and out through the open end of the hoses 60 which are banded together by means of a clamp 62 and aimed at the ware 56. Since the gun 54 sprays on air principle, the force of the spheres 52 propelled thereby can be conveniently varied. As the spheres 52 bounce off the ware 56 they drop into a funnel 58 which is positioned over collector hopper 50. Hence a continuous cycle is maintained throughout the operation.

In this invention it is preferred to use glass spheres to achieve the desired effects. However, other sphere materials can also be employed such as rubber, polystyrene, nylon, metal and the like.

Similarly, spheres having a diameter of from about ⅜inch to ¼inch are preferred since such is a convenient size to work with without any damage to surface integrity of the china body. However, spheres having diameters in the order from about 1/16 inch to about 1 inch can be used without departing from the scope of the invention.

The china surface can be impacted by the spheres in several manners. For example, a simple commercially available air gun can be used to project the spheres on to the china surface from a predetermined height. Generally, glass spheres dropped from a height of about 1 foot produces the desired results. However, the drop height will vary depending on the density and elasticity of the sphere material. Thus, if rubber spheres are employed, then a drop height of about 4 feet is suitable.

In order that those skilled in the art may better understand how the present invention may be practiced, the following examples are given by way of illustration and not by way of limitation.

EXAMPLE I

Glass spheres having a diameter of about ¼inch (about 6 mm.) were dropped by hand from a height on 1 foot on five unfired flat, drying china samples having a bulk specific gravity of 1.8 at the rate of approximately 500 impacts per square inch of surface. Each sphere dented the china surface, causing dents approximately 20 mils in diameter and one mil in depth. Impacting by the spheres caused the samples to bow which is indicative of densification. Subsequent to the impacting step, the samples were fired along with samples which were not impacted by the spheres, in a manner that permitted free warpage of the samples. The result after firing was that the impacted surfaces were strained outward, while the nonimpacted surfaces were not, demonstrating that compression had been achieved.

EXAMPLE II

Five china samples were sprayed with water prior to impacting with glass spheres, and the procedure of Example I was employed exactly. Each sphere dented the surface, causing dents approximately 30 mils in diameter and 1 to 2 mils in depth. A high compressive effect was observed.

EXAMPLE III

Five china samples were treated following the procedure of Example I using rubber spheres in place of glass spheres having a diameter of ⅜inch and dropped by hand from a height of 4 feet. Impacting caused bowing indicating densification and the impacted surfaces were strained outward after firing demonstrating that compression had been achieved at the surface of the samples.

While the present invention has been described with particular reference to the treatment of china bodies with sphere shaped materials, it will be obvious to those skilled in the art that the process described herein is suitable for densifying like materials in accordance with the present invention.

From the foregoing description it will be seen that the present invention provides china articles which are minimized in defects and thus require minimum refinishing operations subsequent to firing.

What is claimed is:

1. Method of densifying the surface of a porous unfired chinaware body comprising the steps of impacting the surface of a porous unfired chinaware body with a plurality of spheres with a force sufficient to cause a plurality of slight depressions in the surface of said unfired porous china body thereby causing compressive forces in said surface, and firing and vitrifying said porous china body to form a chinaware article.

2. Method of closing clay cracks and pinholes which normally open up during the firing process of a china body comprising the steps of impacting the surface of an unfired porous china body with a plurality of spherical objects with a force sufficient to cause a slight depression in a surface of said unfired china body, and firing said china body whereby the outer layer of said unfired body that has been impacted with said spheres densifies more rapidly during the firing than the interior of said body thereby causing said outer surface to be forced into compression and close clay cracks and pinholes that normally try to open in the opposite direction during the firing step.

3. Method of claim 2 wherein water is applied to the surface of said unfired porous china body in aforesaid surface and impacted with said spheres.

4. Method of claim 2 wherein said spheres have a diameter of from about 1/15 inch to about 1 inch.

5. Method of claim 2 wherein said spheres are glass.

6. Method of claim 2 wherein said spheres are rubber.

7. Method of claim 2 wherein water is applied to surface of said bodies before said surface is impacted with said spheres.

8. Method of claim 5 wherein said spheres are dropped by hand on said surface from a height of about 1 foot.

9. Method of claim 5 wherein said spheres are propelled automatically against said surface.

10. Method of claim 6 wherein said spheres are dropped by hand on said surface from a height of about 4 feet.